(12) United States Patent
Chiu et al.

(10) Patent No.: US 10,348,808 B2
(45) Date of Patent: Jul. 9, 2019

(54) HYBRID CLOUD APPLICATIONS

(71) Applicant: International Business Machines Corporation, Armonk, NY (US)

(72) Inventors: Po-cheng Chiu, Taipei (TW); Wei-Ting Chou, Taipei (TW); Chih-Hsiung Liu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 14/927,652

(22) Filed: Oct. 30, 2015

(65) Prior Publication Data

US 2017/0124340 A1    May 4, 2017

(51) Int. Cl.
G06F 15/16 (2006.01)
H04L 29/08 (2006.01)
H04L 29/06 (2006.01)

(52) U.S. Cl.
CPC .......... *H04L 67/10* (2013.01); *H04L 63/0209* (2013.01); *H04L 63/0272* (2013.01)

(58) Field of Classification Search
CPC .............................. G06F 21/606; H04L 67/10
See application file for complete search history.

(56) References Cited

U.S. PATENT DOCUMENTS

| | | | |
|---|---|---|---|
| 8,504,609 B2 * | 8/2013 | Mansoor | G06F 17/30893 709/202 |
| 8,826,451 B2 | 9/2014 | Blubaugh | |
| 2012/0324069 A1 * | 12/2012 | Nori | H04L 41/0806 709/222 |
| 2014/0181306 A1 | 6/2014 | Kothamasu et al. | |

(Continued)

OTHER PUBLICATIONS

Manheim, ".NET On-Premises/Cloud Hybrid Application Using Service Bus Relay", Hybrid On-Premises/Cloud Application (.NET) / Microsoft Azure, Last updated: Jun. 2, 2015, pp. 1-19, <https://azure.microsoft.com/en-us/documentation/articles/service-bus-dotnet-hybrid-app-using-service-bus-relay/>.

Raheja, "Cloud to On-Premise Connectivity Patterns", Cloud to On-Premise Connectivity Patterns (Oracle Fusion Middleware), dated Nov. 13, 2013, pp. 1-9, <https://blogs.oracle.com/fusionmiddleware/entry/cloud_to_on_premise_connectivity>.

(Continued)

*Primary Examiner* — Aftab N. Khan
*Assistant Examiner* — Anh Nguyen
(74) *Attorney, Agent, or Firm* — Steven F. McDaniel; Jose A. Medina-Cruz; William H. Hartwell

(57) ABSTRACT

As disclosed herein a method, executed by a computer, for enabling a hybrid cloud environment includes receiving, on a cloud environment, a hybrid cloud application package comprising a deployable cloud package and a deployable on-premise package, and deploying the deployable cloud package in a container on the cloud environment, providing a cloud application. The method further includes establishing a secure bi-directional communication tunnel between the cloud environment and an on-premise environment, thereby masking network connection information, and sending, with the secure bi-directional messaging framework, the deployable on-premise package to an on-premise server in the on-premise environment. The method further includes sending a message, with the secure bi-directional messaging framework, requesting services from an on-premise application, and receiving a response from the on-premise application. A computer program product corresponding to the above method is also disclosed herein.

18 Claims, 7 Drawing Sheets

(56) References Cited

U.S. PATENT DOCUMENTS

| | | | |
|---|---|---|---|
| 2015/0012751 A1* | 1/2015 | Forster | H04L 9/30 |
| | | | 713/171 |
| 2015/0133049 A1* | 5/2015 | Lee | H04W 4/60 |
| | | | 455/41.1 |
| 2016/0241596 A1* | 8/2016 | Overby, Jr. | H04L 63/20 |

OTHER PUBLICATIONS

Oracle, "Cloud and On-Premises Integration for Oracle Applications", Oracle Appadvantage Series, Oracle AppAdvantage for Cloud and On-Premises Integration, Oracle Fusion Middleware, Oracle®, Copyright © 2013, Nov. 1, 2013, pp. 1-7.

* cited by examiner

US 10,348,808 B2

HYBRID CLOUD APPLICATIONS

BACKGROUND

The present invention relates to cloud applications, and more particularly to hybrid cloud applications.

A hybrid cloud environment is a cloud computing environment that may use a mix of on-premise (e.g., private cloud) services and public cloud services. The hybrid cloud may allow workload execution to move between private and public clouds as required by computing needs. For applications to successfully execute in the hybrid cloud environment, there must be an orchestration between the two platforms. By allowing workloads to move between private and public clouds as computing needs and costs change, hybrid cloud gives businesses greater flexibility and more data deployment options. Hybrid cloud is particularly valuable for dynamic or highly changeable workloads.

Services in a hybrid cloud environment may consist of a portion of an application specifically developed for and deployed in a public cloud environment. Additionally, there may be a portion of the application that is developed for and deployed on a specific on-premise environment. Once deployed, the cloud and on-premise services may communicate and work seamlessly together.

SUMMARY

As disclosed herein a method, executed by a computer, for enabling a hybrid cloud environment includes receiving, on a cloud environment, a hybrid cloud application package comprising a deployable cloud package and a deployable on-premise package, and deploying the deployable cloud package in a container on the cloud environment, providing a cloud application. The method further includes establishing a secure bi-directional communication tunnel between the cloud environment and an on-premise environment, thereby masking network connection information, and sending, with the secure bi-directional messaging framework, the deployable on-premise package to an on-premise server in the on-premise environment. The method further includes sending a message, with the secure bi-directional messaging framework, requesting services from an on-premise application, and receiving a response from the on-premise application.

As disclosed herein a method, executed by a computer, for enabling a hybrid cloud environment includes receiving, with a secure bi-directional messaging framework, a deployable on-premise package corresponding to a hybrid cloud application, deploying, in a container, on an on-premise server, the deployable on-premise package, providing an on-premise application, and using a secure bi-directional communication tunnel between the cloud environment and an on-premise environment to establish a messaging framework. The method further includes running the on-premise application on a restricted container environment, receiving, from a cloud application, with the secure bi-directional messaging framework, a message comprising requested services, and sending, with the secure bi-directional messaging framework, a response corresponding to the requested services.

As disclosed herein a computer program product, for enabling a hybrid cloud environment. The computer program product includes one or more computer readable storage media and program instructions stored on the one or more computer readable storage media. The program instructions include instructions for receiving, on a cloud environment, a hybrid cloud application package comprising a deployable cloud package and a deployable on-premise package, and deploying the deployable cloud package in a container on the cloud environment, providing a cloud application. The program instruction further include instructions for establishing a secure bi-directional communication tunnel between the cloud environment and an on-premise environment, thereby masking network connection information, and sending, with the secure bi-directional messaging framework, the deployable on-premise package to an on-premise server in the on-premise environment. The program instruction further include instructions for sending a message, with the secure bi-directional messaging framework, requesting services from an on-premise application, and receiving a response from the on-premise application.

DETAILED DESCRIPTION

In today's highly computerized world, the daily operation of corporations, as well as the activities of individuals are highly dependent on computers. Corporations rely on computers and computer applications to operate their business and to provide services to their customers. Many corporations use cloud computing practices to offer online services to their customers. The cloud may be a network of remote servers accessible via the internet (as opposed to a local, corporate owned resources) to store, manage, and process data Use of the cloud offers many advantages, such as streamlined and improved accessibility, as well as reduced capital and infrastructure costs. Even though a corporation may offer services via the cloud, the corporation may prefer to keep its confidential data on-premise due to security and privacy concerns. This may be especially true for companies, such as banking and insurance companies, that treat the customer's data as highly confidential.

Companies that offer services (e.g., web services) via the cloud and maintain data on-premise may encounter the need for the cloud services and on-premise services to communicate and work together. A cloud computing environment which uses a mix of cloud services and on-premise services is known as a hybrid cloud. The hybrid cloud architecture is an environment enabling applications deployed on the cloud to work seamlessly with applications deployed on an on-premise system. In a hybrid cloud environment, there is a need to have a secure, bi-directional connection between the cloud and the on-premise network enabling protected communication.

In addition to networking concerns, developers of hybrid applications (i.e., applications running in a hybrid environment) must also be conscious of programming model and security concerns. In many instances, the cloud application and the on-premise application are developed by different developers, resulting in programming, security, and installation differences. The embodiments disclosed herein generally address the above-described problems.

Figure 1:
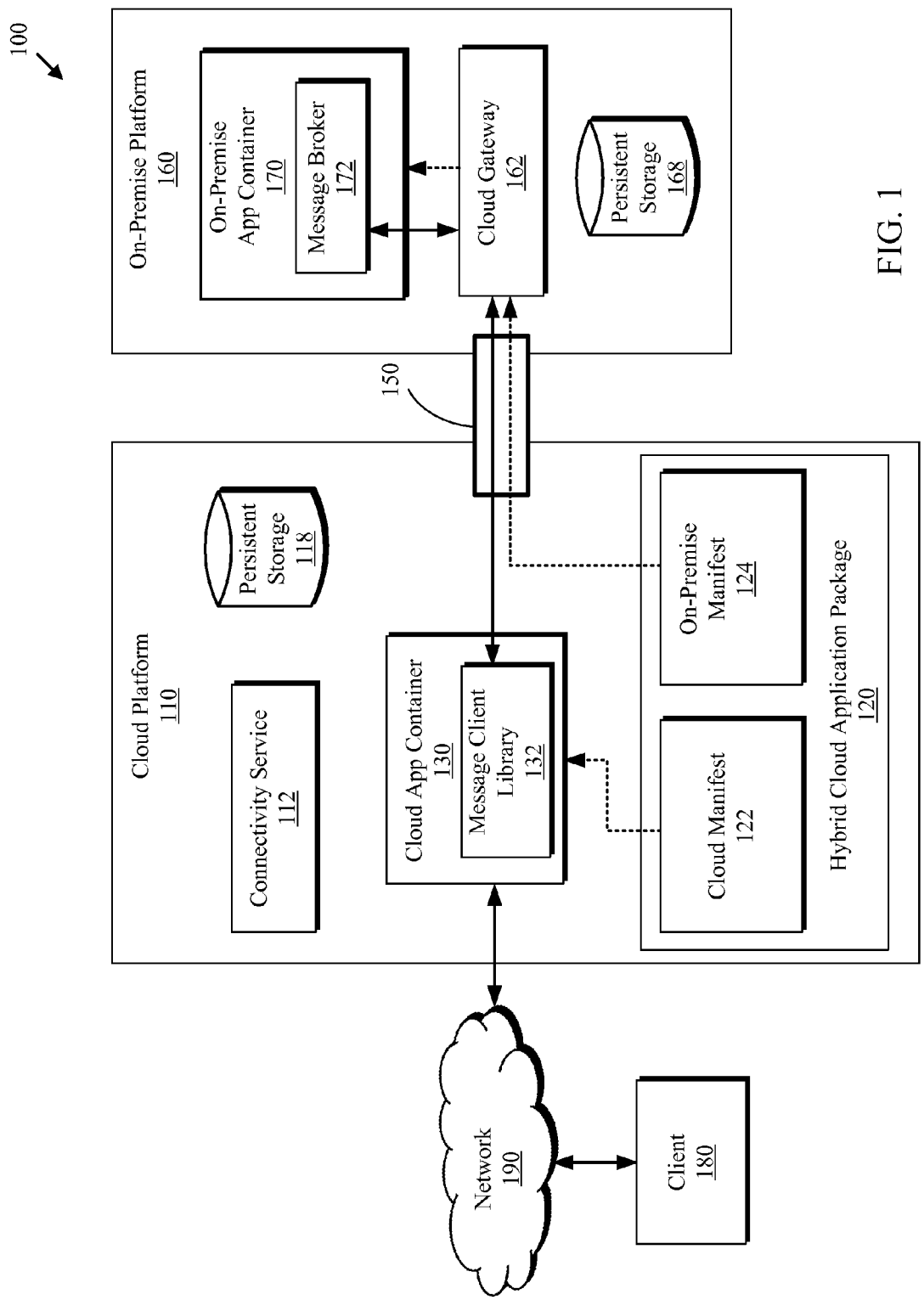
FIG. 1 is a functional block diagram depicting a hybrid cloud environment, in accordance with at least one embodiment of the present invention.

The present invention will now be described in detail with reference to the Figures. FIG. 1 is a functional block diagram depicting a hybrid cloud environment 100, in accordance with an embodiment of the present invention. Hybrid cloud environment 100 includes cloud platform 110, on-premise platform 160, and client 180. Cloud platform 110, on-premise platform 160, and client 180 can include smart phones, tablets, desktop computers, laptop computers, specialized computer servers, or any other computer systems, known in the art, capable of communicating over network 190. In general, cloud platform 110, on-premise platform 160, and client 180 are representative of any electronic devices, or combination of electronic devices, capable of executing machine-readable program instructions, as described in greater detail with regard to FIG. 4.

Cloud platform 110 may be a public cloud environment capable of hosting web applications and providing services for users, such as client 180. As depicted, cloud platform 110 includes a connectivity service 112, persistent storage 118, a hybrid cloud application package 120, and a cloud application container 130. On-premise platform 160 may be a private environment (e.g., a private cloud) of a corporation providing web applications on cloud platform 110. On-premise platform 160 includes a cloud gateway 162, persistent storage 168, and an on-premise application container 170.

Hybrid cloud application package 120 contains two distinct deployable application packages (cloud manifest 122 and on-premise manifest 124) that are to be deployed on cloud platform 110 and on-premise platform 160. Cloud manifest 122 contains information to properly launch cloud application container 130, as well as an application, deployment instructions, and startup parameters for a cloud application that will be deployed on cloud platform 110. On-premise manifest 124 contains information to properly launch on-premise application container 170, as well as deployment instructions, startup parameters, and library dependencies of an on-premise application that will be deployed on on-premise platform 160.

Hybrid cloud application package 120 may be loaded to cloud platform 110 over network 190. When the cloud application package 120 is loaded to cloud platform 110, connectivity service 112 may establish a secure bi-directional communication tunnel 150 between cloud platform 110 and on-premise platform 160. Secure tunnel 150 may bridge the communication between cloud platform 110 and on-premise platform 160, enabling an application running in cloud application container 130 to easily communicate with an application running in on-premise application container 170 without knowing the IP address of cloud gateway 162.

After the cloud application is successfully deployed and running in cloud application container 130, on-premise manifest 124 is transferred to on-premise platform 160 via secure tunnel 150. After being transferred to on-premise platform 160, on-premise manifest 124 launches on-premise application container 170, deploys the on-premise application, and starts the application. Part of the deploy operation, each container (e.g., cloud application container 130 and on-premise application container 170) contain a messaging component (e.g., for example message client library 132 in cloud application container 130 and message broker 172 in on-premise application container 170). The cloud application executing in cloud application container 130 and the on-premise application executing in on-premise application container 170 can communicate with each other using a pub/sub programming model.

Client 180 may be any client that communicates with cloud platform 110 and cloud application container 130 over network 190. On-premise platform 160 may be a web server, an application server, or any computing device capable of receiving traffic over secure tunnel 150. Cloud application container 130 may provide a public online web application (e.g., a banking application, an auction site, a video streaming site, or the like), a corporate internal services (e.g., a billing application, human resources data retention, internal email, and the like), or any other services capable of being run on a computing device. Cloud platform 110 and on-premise platform 160 may be of differing hardware architectures. For example, cloud platform 110 may be hosted on mainframe computers, while on-premise platform 160 may be hosted on a personal computer.

Persistent storage 118 and 168 may be any non-volatile storage media known in the art. For example, persistent storage 118 and 168 can be implemented with a tape library, optical library, one or more independent hard disk drives, or multiple hard disk drives in a redundant array of independent disks (RAID). Similarly, data on persistent storage 118 and 168 may conform to any suitable storage architecture known in the art, such as a file, a relational database, an object-oriented database, and/or one or more tables.

Cloud platform 110, client 180, and other electronic devices (not shown) communicate over network 190. Network 190 can be, for example, a local area network (LAN), a wide area network (WAN) such as the Internet, or a combination of the two, and include wired, wireless, or fiber optic connections. In general, network 190 can be any combination of connections and protocols that will support communications between Cloud platform 110 and client 180, in accordance with an embodiment of the present invention.

Figure 2:
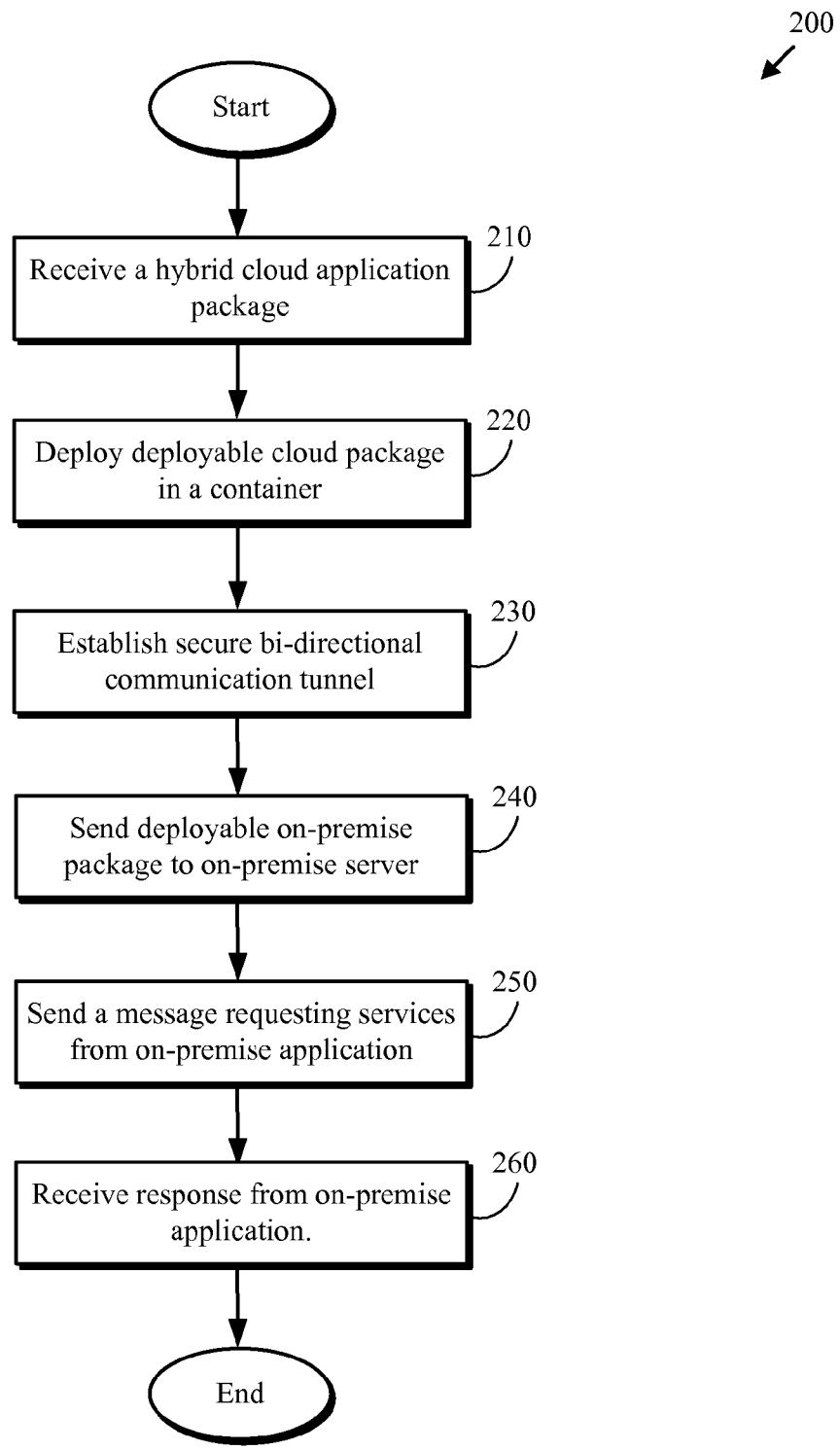
FIG. 2 is a flowchart depicting a cloud platform method, in accordance with at least one embodiment of the present invention.

FIG. 2 is a flowchart depicting a cloud platform method 200, in accordance with at least one embodiment of the present invention. As depicted, cloud platform method 200 includes receiving (210) a hybrid cloud application package, deploying (220) a deployable cloud package in a container, establishing (230) a secure bidirectional communication tunnel, sending (240) a deployable on-premise package to an on-premise server, sending (250) a message requesting services form an on premise application, and receiving (260) a response from the on-premise application. Cloud platform method 200 enables cloud platform 110 to deploy the cloud portion of a hybrid cloud application, initiate the deployment of an on-premise portion of the hybrid cloud application, and establish a secure communication tunnel between the cloud and on-premise hybrid cloud applications.

Receiving (210) a hybrid cloud application package may include cloud platform 110 receiving a single unit (e.g., hybrid cloud application package 120) that includes two applications (a cloud application and an on-premise application) to be deployed. The package may have been created using a programming model for hybrid cloud applications that allows a developer to build both a cloud and an on-premise application (using container technology) as a single unit. Each of the two applications contained in hybrid cloud application package 120 may be defined by a manifest (e.g., cloud manifest 122 and on-premise manifest 124). Each manifest may correspond to a unique deployable package, for example, cloud manifest 122 may correspond to a deployable cloud package, and on-premise manifest 124 may correspond to a deployable on-premise package Deploying (220) a deployable cloud package in a container may include cloud platform 110 retrieving cloud manifest 122 from cloud application package 120. In some embodiments, cloud manifest 122 (the deployable cloud package) contains information (e.g., instructions) to properly launch cloud application container 130, as well as a cloud application, deployment instructions, startup parameters and library dependencies of the cloud application. Cloud platform 110 may use the deployment instructions to deploy the deployable cloud package in cloud application container 110. In some embodiments the cloud application is included in hybrid cloud application package 120. In other embodiments, the cloud application is stored in another location (e.g., on persistent storage 118) and is referenced by cloud manifest 122.

Establishing (230) a secure bidirectional communication tunnel may include cloud platform 110 receiving retrieved connectivity information from connectivity service 112. The connectivity information may include, among other things, an IP address and a connection port of cloud gateway 162 corresponding to the on-premise environment (e.g., on-premise platform 160). In some embodiments, connectivity service 112 provides information corresponding to an existing secure bi-directional communication tunnel (e.g., secure tunnel 150) to cloud platform 110. In other embodiments, connectivity service 112 sets up a new secure bi-directional communication tunnel (e.g., secure tunnel 150) and provides connectivity corresponding to the new secure tunnel to cloud platform 110.

Sending (240) a deployable on-premise package to an on-premise server may include cloud platform 110 retrieving the deployable on-premise package (e.g., on-premise manifest 124) from hybrid cloud application package 120. The deployable on-premise package may be sent to on-premise platform 160 over a secure bi-directional communication tunnel (e.g., secure tunnel 150). In some embodiments, the deployable on-premise package is sent to on-premise platform 160 as soon as the deployable cloud package has been successfully deployed. In other embodiments, the deployable on-premise package is sent to on-premise platform 160 the first time a service corresponding to the deployable on-premise package is requested.

After the on-premise application has been successfully deployed, cloud platform 110 may initialize a messaging framework over secure tunnel 150 to enable simplified communication between the containers in which the two deployed applications run (e.g., cloud application container 130 and on-premise application container 170). In some embodiments, message client library 132 is created to enable the cloud application to send a message to the on-premise application.

Sending (250) a message requesting services form an on premise application may include cloud application container 130 of cloud platform 110 using a messaging framework to send a request to on-premise application container 170 requesting specific services provided by an on-premise application running in on-premise application container 170. The message framework may utilize secure tunnel 150 to move messages between cloud application container 130 and on-premise application container 170. In some embodiments, the messaging framework uses messaging modules (e.g., message client library 132 and message broker 172) to encapsulate messages between different architectures. In one example, cloud application container 130 may be running a banking application, and the user of the application wishes to electronically transfer money from one account to another. However, cloud application container 130 does not have access to the actual user accounts, and therefore message client library 132 sends a message to on-premise application container 170 over secure tunnel 150 to request the transfer be processed. Message broker 172 receives the messages and the application running in on-premise container performs the service.

Receiving (260) a response from the on-premise application may include cloud application container 130 of cloud platform 110 receiving a message from on-premise application container 172 indicating that a service has been performed. In some instances, the response may be a confirmation that the requested service has been performed. In other instances, the response includes information such as requested information (e.g., an existing account balance), or the results of a requested action (e.g., a new account balance after an electronic payment).

Figure 3:
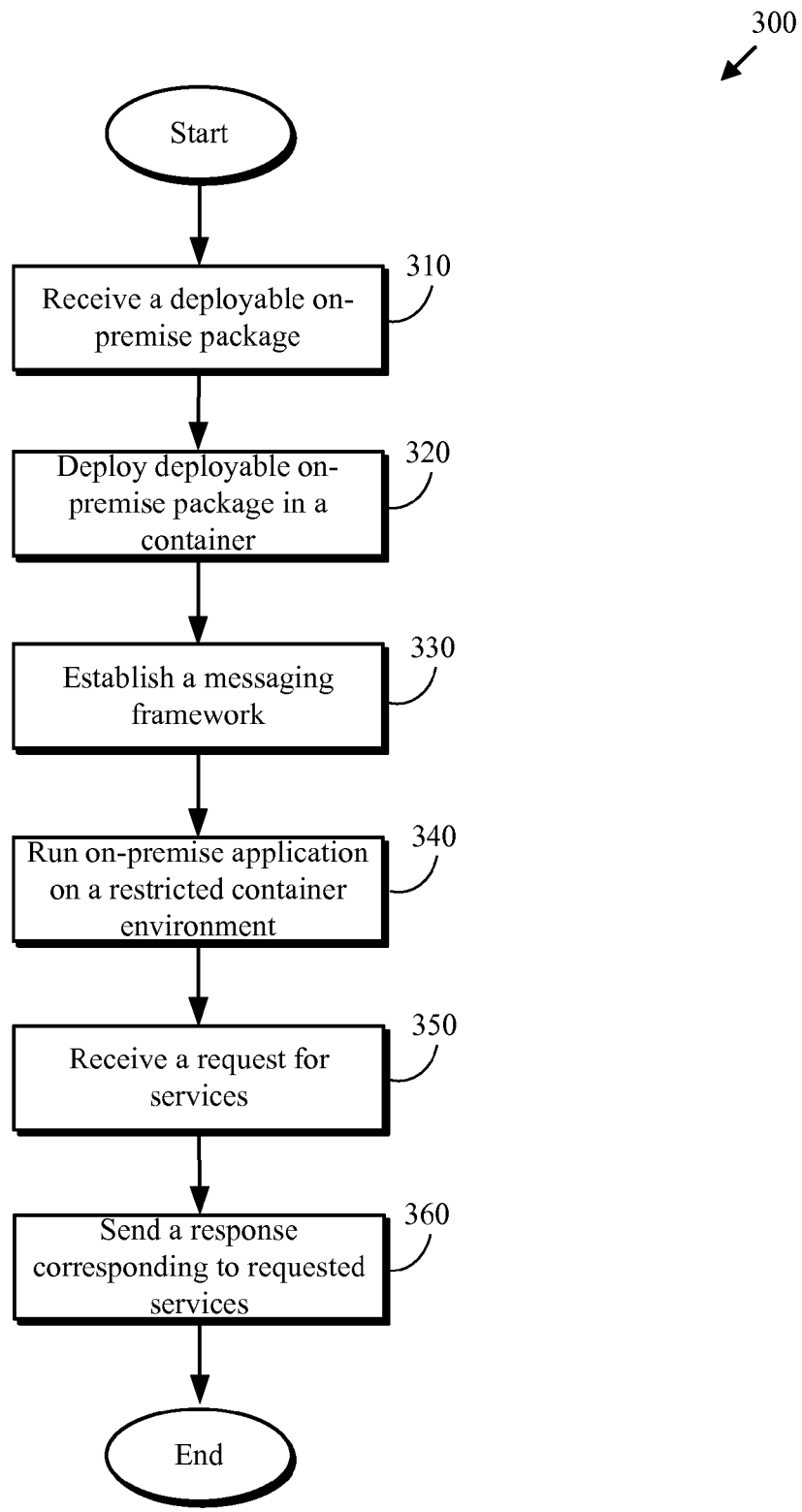
FIG. 3 is a flowchart depicting an on-premise platform method, in accordance with at least one embodiment of the present invention.

FIG. 3 is a flowchart depicting an on-premise platform method 300, in accordance with at least one embodiment of the present invention. As depicted, on-premise platform method 300 includes receiving (310) a deployable on-premise package, deploying (320) a deployable on-premise package in a container, establishing (330) a messaging framework, running (340) an on-premise application on a restricted container environment, receiving (350) a request for services, and sending (360) a response corresponding to requested services. On-premise platform method 300 enables on-premise platform 160 to initiate the deployment of an on-premise portion of the hybrid cloud application in a restricted container, and securely provide services to a cloud portion of the hybrid cloud application.

Receiving (310) a deployable on-premise package may include on-premise platform 160 receiving from a cloud platform (e.g., cloud platform 110) an on-premise portion of a hybrid cloud application package (e.g., receiving on-premise manifest 124 from hybrid cloud application package 120). The deployable on-premise package may be received over secure tunnel 150. In some embodiments, the deployable on-premise package is stored on persistent storage 168. In other embodiments, the deployable on-premise package is retained in memory for immediate deployment. The deployable on-premise package may include an on-premise application and deployment instructions for the on-premise application.

Deploying (320) a deployable on-premise package in a container may include on-premise platform 160 parsing on-premise manifest 124 to identify what deployment operations are required. In some embodiments, on-premise manifest 124 contains instructions to launch on-premise application container 170. In some embodiments, on-premise manifest 124 contains instructions to deploy and start the on-premise application. On-premise platform 160 may use the deployment instructions to deploy the deployable on-premise package in on-premise application container 170. The on-premise application container 170 and on-premise application may be deployed in a perimeter network, also known as a demilitarized zone (DMZ) which may add an additional layer of security between a public cloud (e.g., cloud platform 110) and an organization's local area network (LAN). Cloud platform 110 only has direct access (via tunnel 150 through cloud gateway 162) to resources in the DMZ, rather than any other part of the organization's network. However, the on-premise application can access the on-premise network and therefore is able to provide services that require access to on-premise resources.

Establishing (330) a messaging framework may include on-premise platform 160 using secure tunnel 150 and messaging framework technology to provide simplified hybrid cloud communication. In some embodiment, upon successful deployment of the on-premise application, a message broker is automatically deployed to on-premise application container 170 to facilitate a secure messaging framework. In some embodiments, establishing operation 330 coincides with similar messaging framework activities on cloud platform 110. The message framework may include a message client library 132 corresponding to cloud application container 130 and message broker 172 corresponding to on-premise application container 170.

Running (340) an on-premise application on a restricted container environment may include on-premise platform 160 retrieving, from on-premise manifest 124, startup information. Startup information may include required prerequisite dependencies, application startup location, application startup commands, and application startup command parameters. When the on-premise application is fully initialized (e.g., running and ready to accept requests), the application may be prepared to provide one or more services. In some embodiments, after a period of inactivity, the application enters a sleep state and re-activates when a message requesting services is received on a message framework. In other embodiments, the application remains fully active until the application is shut down.

Receiving (350) a request for services may include on-premise platform 160 using a messaging framework to receive, over secure tunnel 150, a message requesting services that may be provided by the on-premise application. Message broker 172 may translate the messaging from the messaging protocol of the sender to the messaging protocol of on-premise platform 160. In some embodiments, message broker 172 performs additional authentication to confirm the request originated from an authorized requester. The on-premise application, running in on-premise container 170 may receive the message, determine what services are being requested, and perform the requested services.

Sending (360) a response corresponding to requested services may include on-premise platform 160 completing a requested service request. Upon completion of the service request, on-premise application container 170 may respond to a requester (e.g., cloud application container 130) indicating that the request has completed. In some embodiments, the response includes results of the requested service. In other embodiments, the response contains an indication of success or failure and a reference (e.g., a pointer, or a url) providing a location to obtain any additional results of the service. In some embodiments, the response contains an indication of success or failure of the request without providing any additional details or data.

Figure 4:
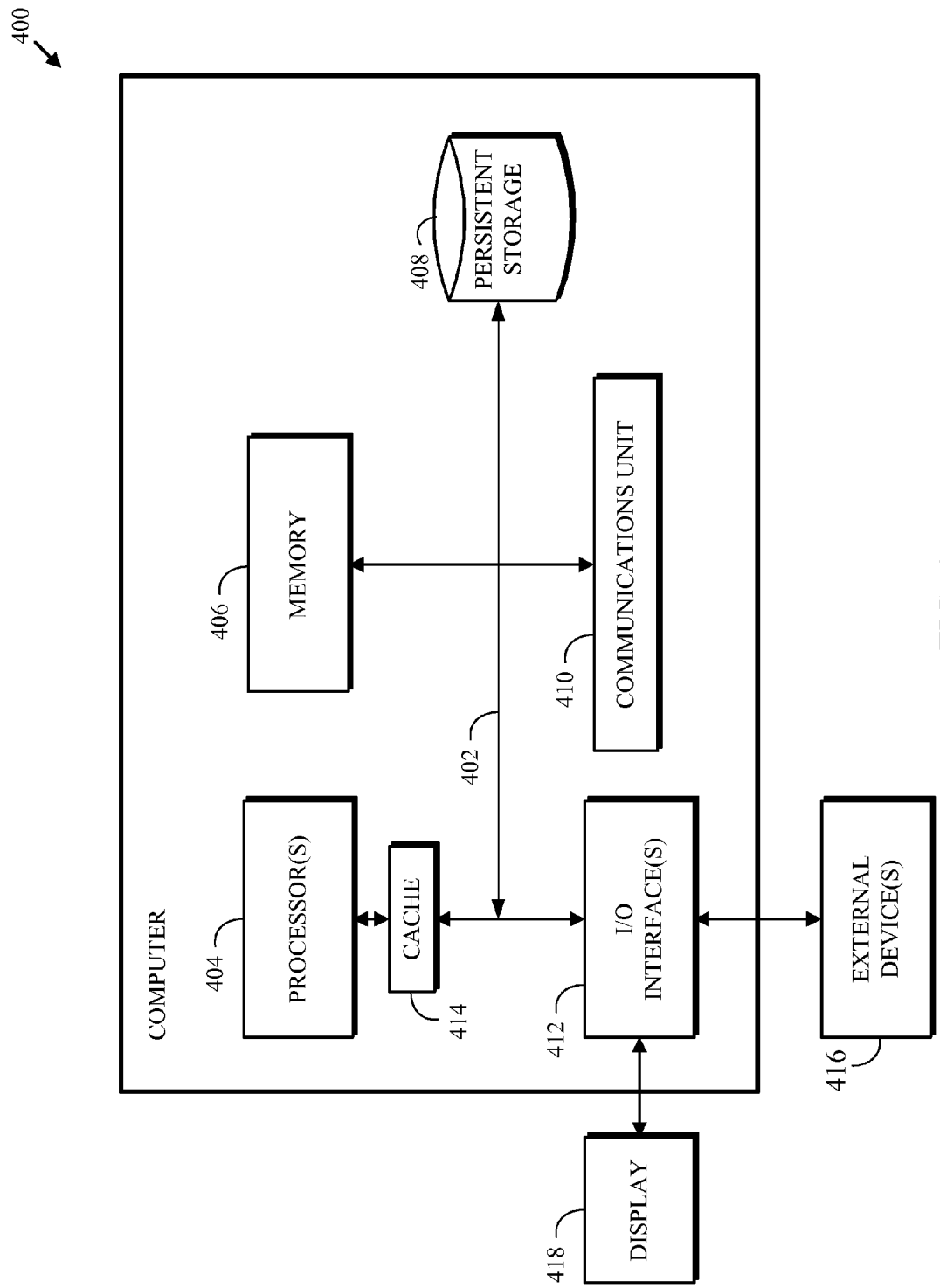
FIG. 4 is a functional block diagram depicting various components of one embodiment of a computer suitable for executing the methods disclosed herein.

FIG. 4 depicts a functional block diagram of components of a computer system 400, which is an example of systems such as test intruder 110 and server 130 within computing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Intruder 110, intrusion analysis system 120, and server 130 include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., thread-local management method 200 are stored in persistent storage 408 for execution and/or access by one or more of the respective processor(s) 404 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of intruder 110, intrusion analysis system 120, and server 130. In these examples, communications unit 410 includes one or more network interface cards. Communications unit 410 may provide communications through the use of either or both physical and wireless communications links. Program instructions and data used to practice embodiments of thread-local management method 200 may be downloaded to persistent storage 408 through communications unit 410.

I/O interface(s) 412 allows for input and output of data with other devices that may be connected to each computer system. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
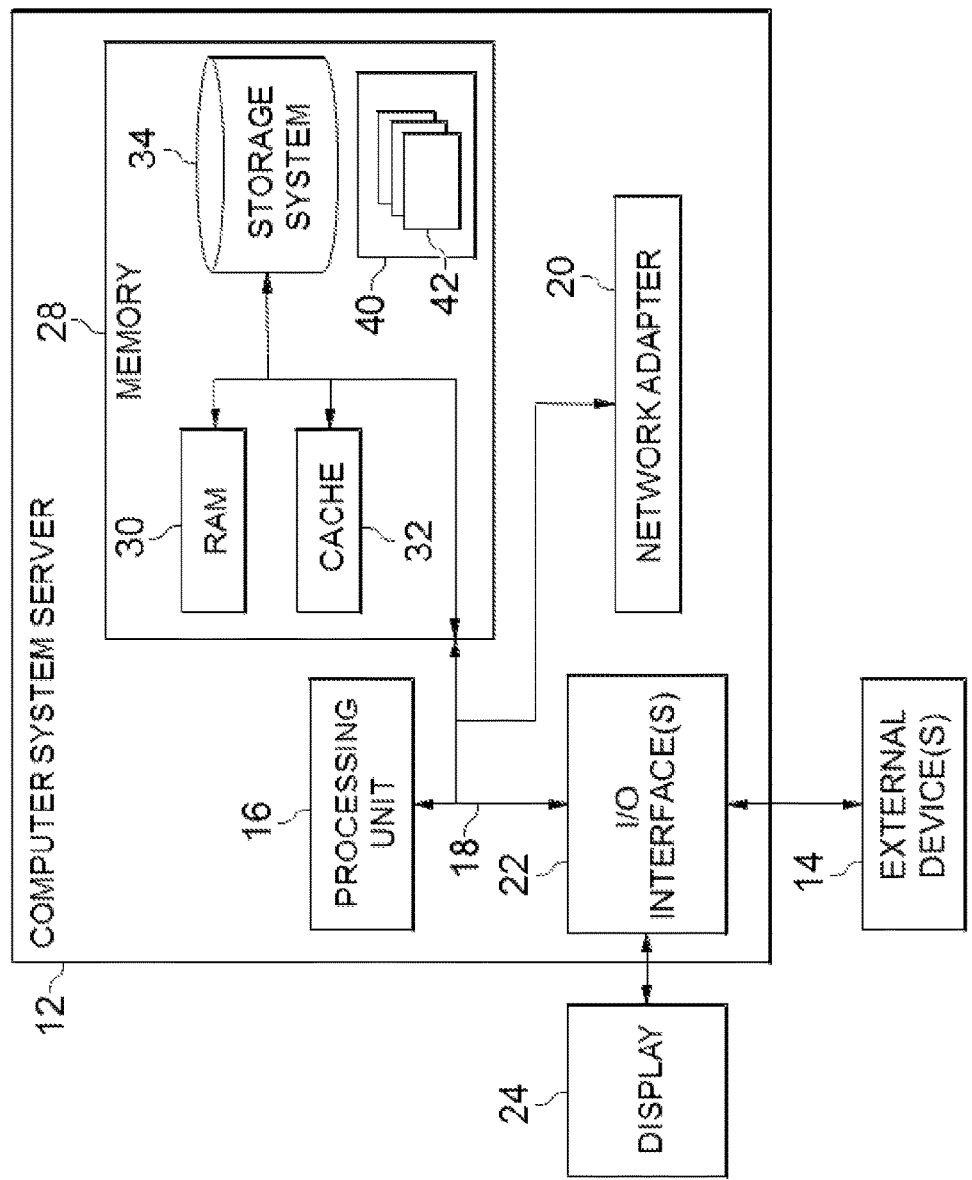
FIG. 5 is a block diagram depicting a cloud computing node according to an embodiment of the present invention.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
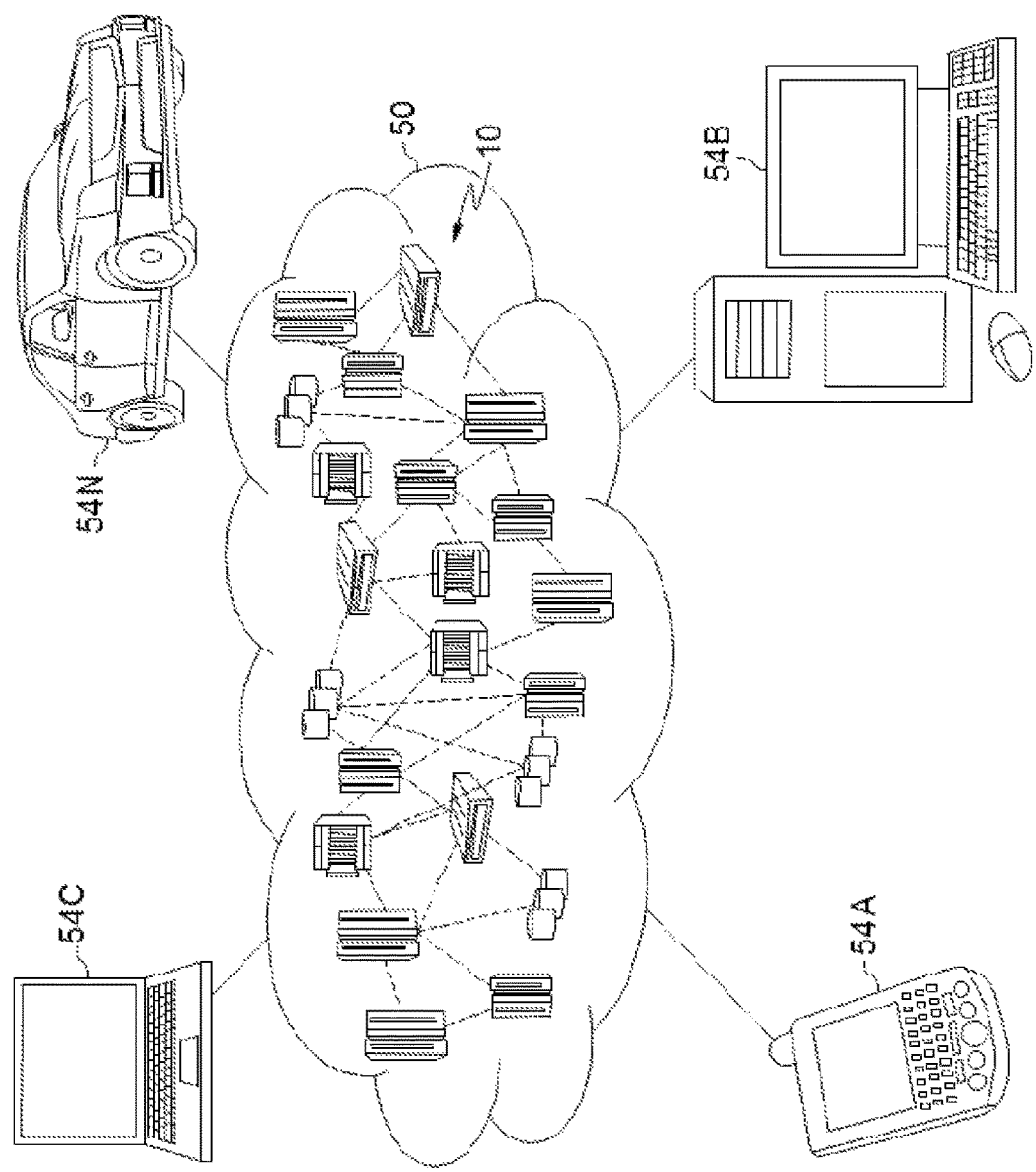
FIG. 6 is a schematic diagram depicting a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
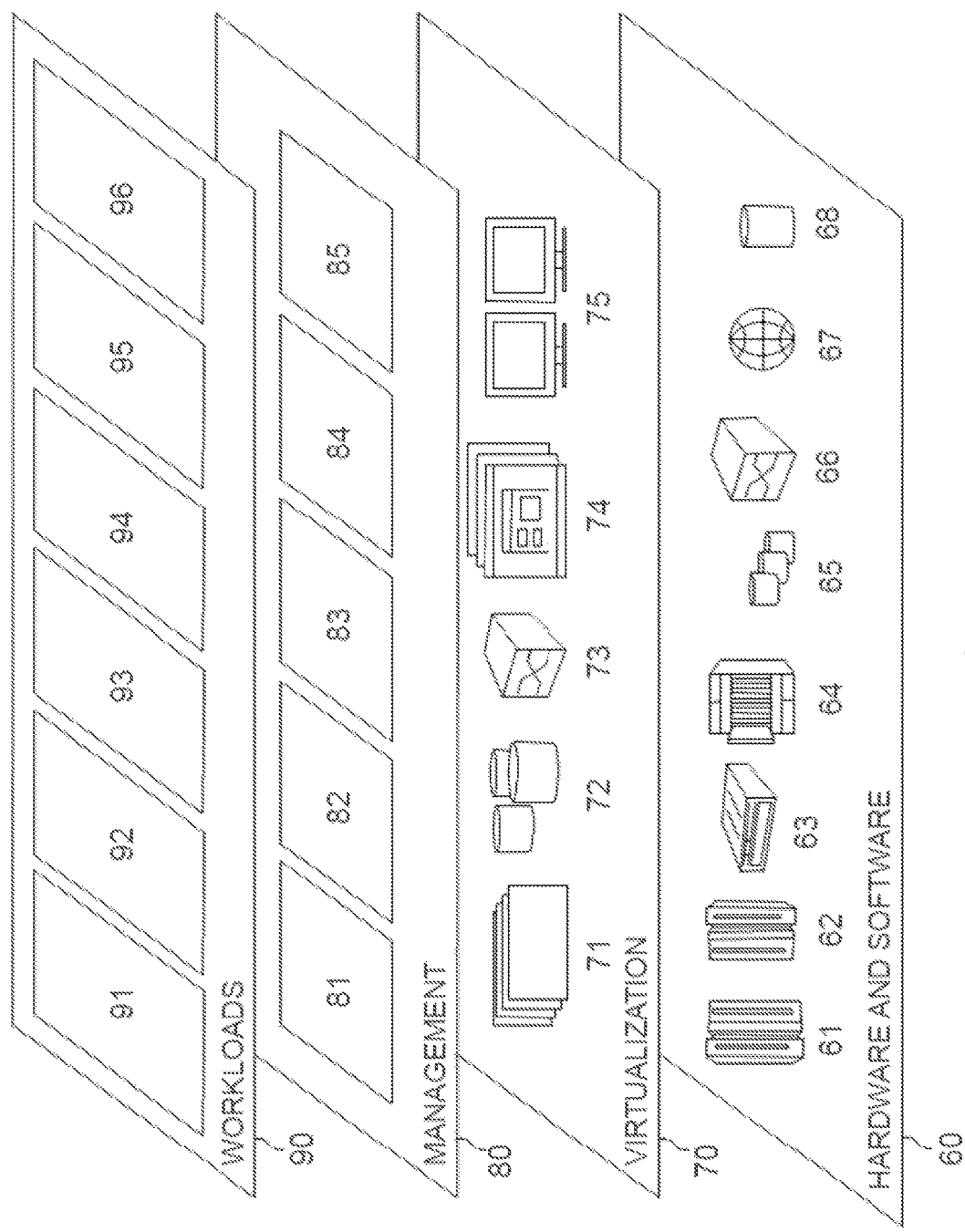
FIG. 7 is a schematic diagram depicting abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and deployed enterprise application 96.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method comprising:
   receiving, on a cloud environment, a hybrid cloud application package comprising a deployable cloud package and a deployable on-premise package, the deployable cloud package including instructions for deploying a cloud application in the cloud environment, the deployable on-premise package including instructions for deploying an on-premise application in a perimeter network on an on-premise environment, and the on-premise environment including a cloud gateway;
   deploying the cloud application in a container on the cloud environment according to the instructions in the deployable cloud package;
   establishing a secure bi-directional messaging framework between the cloud environment and the on-premise environment, thereby masking an IP address and a connection port of the cloud gateway on the on-premise environment;
   sending, on demand, with the secure bi-directional messaging framework and through the cloud gateway, the deployable on-premise package to an on-premise server in the perimeter network on the on-premise environment;
   sending a message, with the secure bi-directional messaging framework and through the cloud gateway, requesting services from the on-premise application; and
   receiving a response from the on-premise application,
   wherein the messaging framework includes a message client library and a message broker to encapsulate messages between different computer architectures, and wherein the message broker authenticates the message requesting services from the on-premise application to confirm the message originated from an authorized requester.

2. The method of claim 1, wherein the deployable cloud package further includes the cloud application.

3. The method of claim 2, wherein the instructions for deploying the cloud application in the cloud environment include: container startup information, application startup parameters, and library dependencies.

4. The method of claim 1, further comprising retrieving connectivity information from a connectivity service.

5. A method comprising:
   receiving, with a secure bi-directional messaging framework, a deployable on-premise package corresponding to a hybrid cloud application, the deployable on-premise package including instructions for deploying an on-premise application in a perimeter network on an on-premise environment, and the on-premise environment including a cloud gateway;
   deploying, in a container, on an on-premise server, the deployable on-premise package in the perimeter network on the on-premise environment, providing the on-premise application;
   using a secure bi-directional communication tunnel between a cloud environment and the on-premise environment to establish the secure bi-directional messaging framework, thereby masking an IP address and a connection port of the cloud gateway on the on-premise environment;
   running the on-premise application in the perimeter network on a restricted container environment;
   receiving, from a cloud application and through the cloud gateway, with the secure bi-directional messaging framework, a message comprising requested services; and
   sending, with the secure bi-directional messaging framework and through the cloud gateway, a response corresponding to the requested services,
   wherein the on-premise application enters a sleep state after a period of inactivity and re-activates when the message comprising requested services is received, wherein the messaging framework includes a message client library and a message broker to encapsulate messages between different computer architectures, and wherein the message broker authenticates the message requesting services from the on-premise application to confirm the message originated from an authorized requester.

6. The method of claim 5, wherein the deployable on-premise package further includes the on-premise application.

7. The method of claim 6, wherein the instructions for deploying the on-premise application in the perimeter network on the on-premise environment include: container startup information, application startup parameters, and library dependencies.

8. The method of claim 5, wherein the cloud gateway provides access to a secure restricted hosting environment for the container to run in.

9. A computer program product comprising:
   one or more computer readable storage media and program instructions stored on the one or more computer readable storage media, the program instructions comprising instructions for:
   receiving, on a cloud environment, a hybrid cloud application package comprising a deployable cloud package and a deployable on-premise package, the deployable cloud package including instructions for deploying a cloud application in the cloud environment, the deployable on-premise package including instructions for deploying an on-premise application in a perimeter network on an on-premise environment, and the on-premise environment including a cloud gateway;

deploying the cloud application in a container on the cloud environment according to the instructions in the deployable cloud package;

establishing a secure bi-directional communication tunnel between the cloud environment and the on-premise environment, thereby masking an IP address and a connection port of the cloud gateway on the on-premise environment;

sending, with the secure bi-directional messaging framework and through the cloud gateway, the deployable on-premise package to an on-premise server in the perimeter network on the on-premise environment;

sending a message, with the secure bi-directional messaging framework and through the cloud gateway, requesting services from the on-premise application; and receiving a response from the on-premise application, wherein the messaging framework includes a message client library and a message broker to encapsulate messages between different computer architectures, and wherein the message broker authenticates the message requesting services from the on-premise application to confirm the message originated from an authorized requester.

10. The computer program product of claim 9, wherein the deployable cloud package further includes the cloud application.

11. The computer program product of claim 10, wherein the instructions for deploying the cloud application in the cloud environment include: container startup information, application startup parameters, and library dependencies.

12. The computer program product of claim 9, wherein the program instructions include instructions for retrieving connectivity information from a connectivity service.

13. The method of claim 1, wherein the sending of the deployable on-premise package to the on-premise server is performed in response to the deploying of the cloud application in the container on the cloud environment.

14. The method of claim 1, wherein the sending of the deployable on-premise package to the on-premise server is performed in response to a service corresponding to the deployable on-premise package being requested.

15. The method of claim 5, wherein the response includes results of the requested service.

16. The method of claim 5, wherein the response contains an indication of success of the requested service and a reference providing a location to obtain results of the requested service.

17. The computer program product of claim 9, wherein the sending of the deployable on-premise package to the on-premise server is performed in response to the deploying of the cloud application in the container on the cloud environment.

18. The computer program product of claim 9, wherein the sending of the deployable on-premise package to the on-premise server is performed in response to a service corresponding to the deployable on-premise package being requested.

* * * * *